Figure 1:
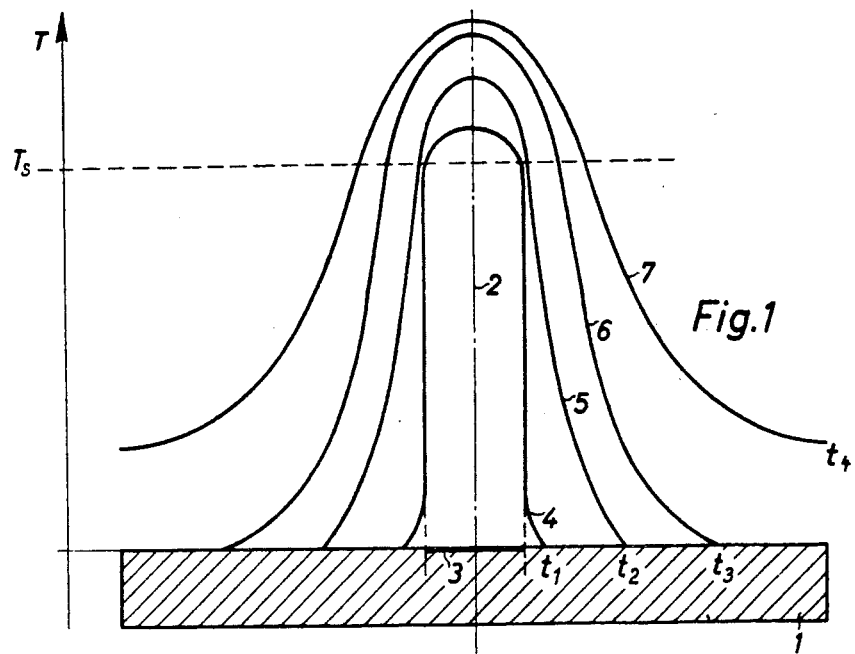

United States Patent Office 2,902,583
Patented Sept. 1, 1959

2,902,583

METHOD FOR WORKING MATERIALS BY MEANS OF A BEAM OF CHARGED PARTICLES

Karl Heinz Steigerwald, Heidenheim (Brenz), Wurttemberg, Germany, assignor to Carl Zeiss, Heidenheim (Brenz), Wurttemberg, Germany Application June 22, 1956, Serial No. 593,280

Claims priority, application Germany July 6, 1955

10 Claims. (Cl. 219—50)

In the working of materials by means of charged particles, for instance in the production of boreholes the zone to be worked upon in the material is so intensely heated by bombardment with charged particles that the material volatilises in this zone. Thereby it is possible to transform by chemical reaction the material which is intensely heated locally, for instance by a gas led to the place worked upon, so that it easily enters the vapour phase.

On impinging of a beam of charged particles upon the object to be worked heat energy is at first imparted to the layer of the material immediately hit, on the surface of the object. If the intensity of the beam of charged particles is sufficiently high this top-most layer of material is almost immediately melted and heated in such a way that turbulent evaporation occurs within the impinging zone of the beam. Simultaneously the heated zone of the material gives off heat energy by conduction to the surrounding as yet cold material. In this way a continuous heat-flux occurs towards the regions of the material surrounding the zone worked upon. With uniform energy radiation by the beam of charged particles a temperature distribution will establish itself after some time which corresponds to the state of equilibrium determined by the conditions of energy exchange. The state of equilibrium is dependent to a large extent on the thermic qualities of the material to be worked upon, particularly on its heat conductivity. This means the temperature rise at the zone to be worked upon will be the higher the lower the heat conductivity of the material.

In order to attain sufficiently rapid vaporisation of the material in the zone to be worked upon it is necessary to heat the material so high that the vapour pressure is high enough. In order to melt only those parts of the material which are to be released from the remaining structure of the material it is required to keep the temperature in the regions bordering the zone to be worked upon below the melting point. It is further advantageous to keep the temperature in the more marginal regions even lower in order to avoid changes in the material.

The method of working materials by continuous irradiation with the charged particles is limited in the application, essentially by the numerical value of the heat-conductivity of the material to be worked upon. Because the irradiated energy, the required rise in temperature, the size of the zone worked upon and the thermic properties of the material to be worked are all in relation with each other the requirement of a very steep drop of temperature at the edge of the zone to be worked upon cannot always be fulfilled, so that in many materials already at the amount of irradiation energy necessary to melt the radiated zone, melting of the marginal regions occurs by heat conduction. In boring holes e.g. there may thereby gather masses of molten material in the bore-hole produced, which will result in the heating and melting of ever increasing marginal zones of the material by way of heat conduction. In this way the workability deteriorates increasingly in the course of the boring procedure.

By the method according to the invention all these disadvantages described are avoided. More particularly this method permits to make the workability of a material independent of its thermal properties to practically any degree. This is achieved in that the intensity of the beam of charged particles serving to work upon the material is altered temporarily. According to the development of the invention the intensity of the beam of charged particles is altered in the shape of impulses. In the pauses between the impulses the material to be worked upon can cool so far that at the beginning of each impulse the same initial condition is established.

Figure 2:
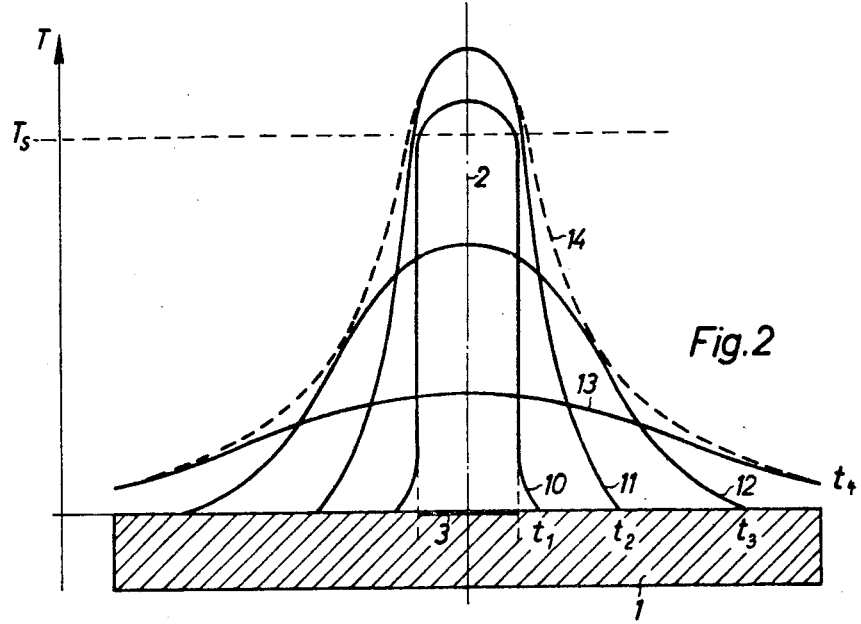

The difference between the thermal process upon continuous and discontinuous irradiation of a beam of charged particles is explained in more detail by way of the accompanying Figs. 1 and 2, whereby Fig. 1 shows diagrammatically the temperature course at the surface of a continuous irradiated plate for various moments in time, Fig. 2 shows diagrammatically the temperature course at the surface of a discontinuous irradiated plate for various moments in time.

In both figures the temperature course is only shown principally neglecting its finer structure.

Referring now to Fig. 1 there is shown a plate 1 drawn in section. A beam of rotary symmetry whose central axis is designated 2 hits continually and with uniform current density distribution the circular zone 3 drawn in section. The temperature distribution establishing itself at the subsequent moments in time $t_1$ to $t_4$ upon the surface of the plate are shown by the curves 4 to 7.

At the first moment of impinging the beam of charged particles heats only a very thin layer of material within the circular zone 3 which by the steep drop in temperature towards the bordering regions is exposed to intensive cooling. At first the temperature distribution is rectangular over the section of 3. With progressive heating of a thicker layer of material as a consequence of further continuous irradiation of charged particles the cooling of zone 3 is reduced, the temperature in this zone rises further and at a moment in time designated $t_1$ the temperature distribution shown in 4 which is only approximately rectangular establishes itself. The preceding rectangular temperature distribution lies at a lower temperature value and is not shown here for the sake of clarity. Upon further continuous irradiation by the beam of charged particles more and more heat reaches the neighbouring regions of the plate 1 from the zone 3 by heat conduction, and the temperature distribution passes through hte curves 5 to 7 and finally reaches a state of equilibrium.

As is shown by the curves 4 to 7 the material outside the zone 5 also is heated beyond the melting point $T_s$. The extent of the molten zone is therefore not solely determined by the geometrical form of the beam of charged particles.

In Fig. 2 is shown diagrammatically the process which occurs upon discontinuous irradiation by a beam of charged particles. The zone 3 is irradiated by an impulse of charged particles whose duration in time extends from $t_0$ to $t_2$. The distribution of the flux density throughout the cross-section of the beam is uniform as in Fig. 1. Similarly the distribution of the current density is constant with respect to the duration of the impulse from the time $t_0$ to $t_2$. The temperature distribution establishes itself in the way described above according to the distribution curves 10 and 11 which correspond to the curves 4 and 5 of Fig. 1. After switching the impulse off a quick temperature drop occurs at the centre of the heated zone.

Since simultaneously the heating extends further in the plate 1, there occur at the moments $t_3$ and $t_4$ temperature distributions according to the curves 12 and 13. The temperature maximum becomes flatter and flatter and the heating of the plate 1 gradually disappears entirely.

The temperature distributions existing at any moment in time throughout the procedure may be collected in a family of curves whose envelope is represented by the dashed curve 14. This curve therefore determines the effective working produced by the impulse irradiation. As shown in Fig. 2 only that part of the plate 1 is melted which lies between the intersection points of the curve 14 with the ordinate $T_s$ corresponding to the melting temperature. This zone is far more accurately determined by the geometrical shape of the incident beam of charged particles than in the case shown in Fig. 1. Upon repetition of several impulses in sequence with equal pauses between the impulses the same temperature distribution will establish itself again and again, which can be represented by an envelope of the kind of the curve 14.

With impulse-shaped irradiation by a beam of charged particles it is possible to expose the material for short periods to significantly higher current densities than is the case in continuous irradiation by a beam of charged particles, without transgressing the borders of the zone to be worked upon. Therein only a very thin layer of the material is heated extremely intensely during the duration of each impulse.

It is a particular property of the charged particles slowed down in a material that the maximum density of the energy liberated from them does not lie on the surface of the irradiated material but in a deeper layer of the material determined by their range of penetration. With sufficient intensity and sufficiently short duration of the impulse it is therefore possible to cause evaporation inside the material while the layers above this are merely melted. The high vapour pressure occurring below the molten skin throws the overlying material high, so that a displacement of material similar to an explosion takes place.

As the impulse duration becomes shorter with constant pauses between the impulses the temperature distribution curves occurring approach more and more the shape of a rectangle. In this way even the upper part of the envelope of these curves assumes largely rectangular form. It is therefore advantageous to select the temperature distribution upon a piece of material to be worked upon particularly by the intensity and by the duration of the irradiated impulse of charged particles. In many cases it is also advantageous to select the intensity distribution course during an impulse not constant but variable in time.

According to a development of the invention the radiation intensity during the pauses between the impulses is not allowed to drop to zero but set to finite value.

According to a further characteristic of the invention the beam of charged particles is defocussed or deflected during the pauses between the impulses. In this way it is possible to produce a tempering effect on the material worked upon.

For the boring of holes that may e.g. have conical shape it is in certain circumstances required to alter the shape of the beam of charged particles from impulse to impulse. This may take place by adjustment of the electron-optical means shaping the electron beam.

The formation of the impulses of charged particles may take place either by mechanical means, e.g. by a mechanically moved shading device or by electrical means, e.g. by governing the emission of the source of charged particles or by deflection of the beam of charged particles by means of essentially known electrical devices or also by providing a defocussing lens.

If an object is to be worked upon at various places or if a zone to be worked upon is comparatively large it is advantageous to change the place of incidence of the beam of charged particles on the object to be worked upon during the irradiation or between the impulses by relative motion between the object and the beam of charged particles. If several objects to be worked upon exist it is advantageous to expose these consecutively to impulse after impulse to the beam of charged particles. This may be done by suitable movement of the objects by means of feeding devices or by suitable deflection of the beam of charged particles. According to a development of the invention the movement of the objects or the deflection of the beam of charged particles is regulated in definite ways with respect to the sequence of impulses.

In many cases it is advantageous with certain materials to work with several beams of charged particles of varying composition. All these beams of charged particles may be governed intermittently and may impinge one after the other upon the same zone to be worked upon. It is also possible to let part of the different beams of charged particles impinge simultaneously upon the same zone of the object to be worked upon.

In working materials by an intermittent beam of charged particles the object to be worked upon is exposed to great stresses by the temperature variations produced and the thermal expansion occurring therein. According to a development of the invention the object to be worked upon may be heated partly or entirely to a temperature which excludes destruction by these thermal stresses. This may be achieved by heating the object to be worked upon by additional beams of charged particles or by e. g. electrical heating devices before, during and after the working to a definite and preferably adjustable temperature. Therein it is an advantage to regulate automatically the heating of the object by photo-electrical or by thermo-electrical regulating devices. It is further advantageous to regulate automatically also the beam of charged particles serving to work upon the object by photo-electrical or thermo-electrical regulating devices in dependence upon the thermal processes occurring in the working.

In order e.g. to obtain chemical effects or to be able to produce surface coatings on partial zones of the zone to be worked upon or upon the entire irradiated zone it is advantageous to bring additional substances during the pauses between the impulses or during definite periods of the entire working procedure to the vicinity of or to the place to be worked upon e.g. by sputtering.

I claim:

1. A method for working a material comprising the steps of focusing a beam of charged particles on a discrete area of said material and intermittently varying the energy content of said beam of charged particles impinging on said discrete area; said energy content being varied to have a high energy interval and a low energy interval; working of said discrete area of said material being affected only during said high energy intervals; said discrete area of said material being cooled by heat conduction into material adjacent said discrete area during said low energy intervals without affecting a physical change of said material adjacent to said area of impingement.

2. A method for working a material comprising the steps of focusing a pulsed beam of charged particles on a discrete area of said material and controllably adjusting the pulse width of said beam of charged particles; adjustment of said pulse width adjusting the energy content of said beam impinging upon said discrete area of said material; said energy content being varied to have a high energy interval and a low energy interval; working of said discrete area of said material being affected only during said high energy intervals; said discrete area of said material being cooled by heat conduction into material adjacent said discrete area during said low energy intervals without effecting a physical change of said material adjacent to said area of impingement.

3. A method for working a material comprising the steps of focusing a pulsed beam of charged particles on a discrete area of said material and controllably adjusting the pulse width and pulse frequency of said beam of charged particles; adjustment of said pulse width adjusting the energy content of said beam impinging upon said discrete area of said material; said energy content being varied to have a high energy interval and a low energy interval; working of said discrete area of said material being affected only during said high energy intervals; said discrete area of said material being cooled by heat conduction into material adjacent said discrete area during said low energy intervals without effecting a physical change of said material adjacent to said area of impingement.

4. A method for working a material comprising the steps of focusing a beam of charged particles on a discrete area of said material, and controlling the intensity distribution of said beam across the area that said beam impinges on said discrete area whereby a first portion of said discrete area is exposed to an intensity sufficient to effect a physical change thereof while a second portion of said discrete area is exposed to an intensity which is insufficient to effect a physical change thereof.

5. A method for working a material comprising the steps of focusing a pulsed beam of charged particles on a discrete area of said material, and controlling the intensity distribution of said beam across the area that said beam impinges on said discrete area whereby a first portion of said discrete area is exposed to an intensity sufficient to effect a physical change thereof while a second portion of said discrete area is exposed to an intensity which is insufficient to effect a physical change thereof; the intervals between pulses being sufficiently long to allow heat concentrated at said first and second portions of said discrete areas to be conducted to adjacent portions of said material without causing a physical change of the boundary between said first and second portions.

6. A method of working a material comprising the steps of focusing a beam of charged particles on a discrete area of said material and intermittently varying the energy content of said beam of charged particles impinging on said discrete area by intermittently defocusing said beam of charged particles; said energy content being varied to have a high energy interval and a low energy interval; working of said discrete area of said material being affected only during said high energy intervals; said discrete area of said material being cooled by heat conduction into material adjacent said discrete area during said low energy intervals without effecting a physical change of said material adjacent to said area of impingement.

7. A method of working a material comprising the steps of focusing a beam of charged particles on a discrete area of said material and intermittently varying the energy content of said beam of charged particles impinging on said discrete area; said energy content being varied to have a high energy interval and a low energy interval; working of said discrete area of said material being affected only during said high energy intervals; said discrete area of said material being cooled by heat conduction into material adjacent said discrete area during said low energy intervals without effecting a physical change of said material adjacent to said area of impingement and thereafter impinging said beam of charged particles to a second discrete area of said material to be worked.

8. A method for working a material comprising the steps of focusing a first and second pulsed beam of charged particles on a discrete area of said material and controlling the pulsed energy of said first and second beams between a high energy content interval and a low energy content interval; working of said discrete area of said material being affected only during said high energy intervals; said discrete area of said material being cooled by heat conduction into material adjacent said discrete area during said low energy intervals without effecting a physical change of said material adjacent to said area of impingement.

9. A method for working a material comprising the steps of bringing said material to be worked to a predetermined temperature by focusing a beam of charged particles on a discrete area of said material and intermittently varying the energy content of said beam of charged particles impinging on said discrete area; said energy content being varied to have a high energy interval and a low energy interval; working of said discrete area of said material being affected only during said high energy intervals; said discrete area of said material being cooled by heat conduction into material adjacent said discrete area during said low energy intervals without effecting a physical change of said material adjacent to said area of impingement.

10. A method for working a material comprising the steps of focusing a beam of charged particles on a discrete area of said material and intermittently varying the energy content of said beam of charged particles impinging on said discrete area; said energy content being varied to have a high energy interval and a substantially zero energy interval; working of said discrete area of said material being affected only during said high energy intervals; said discrete area of said material being cooled by heat conduction into material adjacent said discrete area during said substantially zero energy intervals without affecting a physical change of said material adjacent to said area of impingement.

References Cited in the file of this patent

UNITED STATES PATENTS

| 1,715,017 | Thornton et al. | May 28, 1928 |
| 2,046,969 | Redmond | July 7, 1936 |
| 2,243,833 | Bohn | June 5, 1941 |
| 2,267,714 | Borries et al. | Dec. 30, 1941 |
| 2,267,752 | Ruska et al. | Dec. 30, 1941 |
| 2,423,729 | Ruhle | July 8, 1947 |
| 2,778,926 | Schneider | June 22, 1957 |

FOREIGN PATENTS

| 721,969 | Great Britain | Jan. 19, 1955 |